March 8, 1932. F. L. JOHNSON 1,848,566
SUPPORT FOR DRAWING BOARDS OR THE LIKE
Filed Jan. 5, 1929
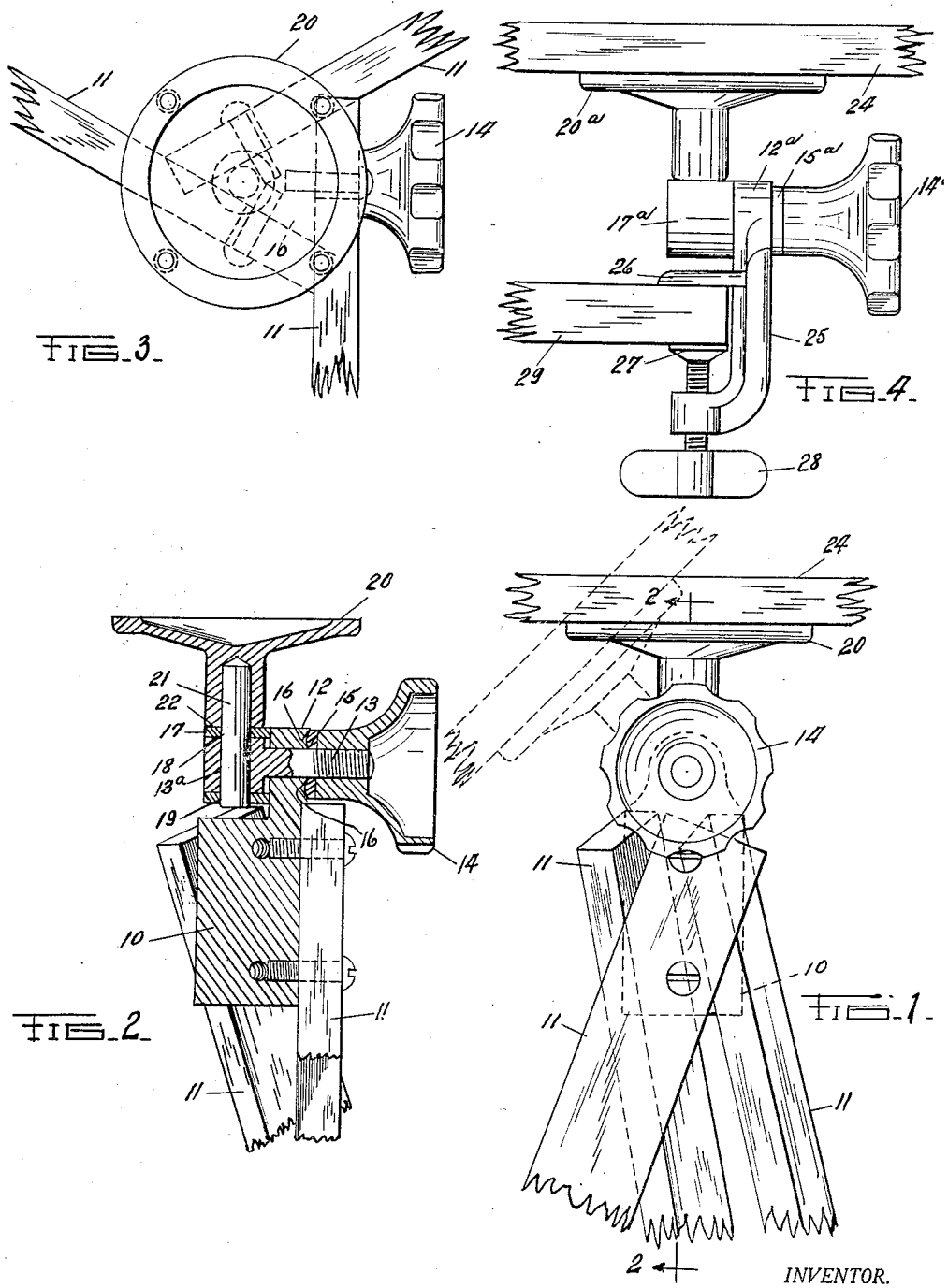
INVENTOR.
Frank L. Johnson.
BY Ely & Barrow
ATTORNEYS.

Patented Mar. 8, 1932

1,848,566

UNITED STATES PATENT OFFICE

FRANK L. JOHNSON, OF AKRON, OHIO

SUPPORT FOR DRAWING BOARDS OR THE LIKE

Application filed January 5, 1929. Serial No. 330,539.

This invention relates to supports for drawing boards such as used by draftsmen, artists, etc.

The general purpose of the invention is to provide an improved drawing board mounting capable of easy and quick adjustment and readjustment to facilitate drawing on the work in different positions.

The foregoing and other purposes of the invention are attained in the drawing board supports illustrated in the accompanying drawings and described below. It is to be understood that the invention is not limited to the specific forms thereof shown and described.

Of the accompanying drawings,

Figure 1 is a side elevation, partly broken away, of a drawing board and mounting in which a support embodying the invention is employed;

Figure 2 is a section on line 2—2 of Figure 1;

Figure 3 is a plan thereof; and

Figure 4 is a front elevation of a modified form of support.

Referring to the drawings, the numeral 10 designates a bracket formed as an equilateral, triangular prism to the three sides of which are secured legs 11, 11 to provide an easel. Extending upwardly from bracket 10 is an apertured lug 12 in which is journaled an eye-bolt 13 arranged to be secured in adjusted positions in the bracket lug by a thumb nut 14 threaded thereon and a washer 15 of resilient frictional material such as leather interposed between nut 14 and the outer face of lug 12. The outer face of lug 12 may be provided with a circumferential series of cavities 16, 16 drilled or otherwise formed therein about the bolt aperture or it may be roughened in other ways to increase the friction between washer 15 and the face of the lug 12.

A sleeve 17 is mounted about the eye 13ª of bolt 13, which eye provides, in effect, a horizontally pivoted support and has apertures at 18 and 19 registering with the eye. The inner end of sleeve 17 bears against the inner face of lug 12. A board-supporting flange member 20 is mounted to rotate in eye 13ª by means of a pin 21, said pin being fixed to the flange member 20 and extending down through apertures 18, 13ª and 19, a shoulder 22 on flange member 20 bearing on the top of sleeve 17. A drawing board 24 is secured on flange member 20 in any suitable way.

In initially adjusting a drawing board on this support, it is turned to the desired position in front of the draftsman or artist about the swivel pin 21 and the forward edge thereof is then lowered, the support pivoting about bolt 13 until the board is at the desired inclination. Thumb nut 14 is then drawn up tightly, serving to secure the bolt 13 in its adjusted position to support the board at the desired angle, and also serving to clamp pin 21 due to the relative axial movement of the bolt and sleeve member caused by drawing of the eye 13ª relative to sleeve 17 and thus holding the board against rotation.

To readjust the board, its lower edge is grasped and raised, causing bolt 13 to thread out of nut 14 whereby the pin 21 is released to permit turning of the board to any desired position, whereupon the edge of the board now in the front position is pushed down, threading bolt 13 back into nut 14, the latter being prevented from turning with the bolt during these operations by reason of the frictional engagement of the resilient washer 15 therewith.

In Figure 4, the same type of adjustable support including flange member 20ª, sleeve 17ª, washer 15ª and nut 14ª, which parts are visible in this view, is shown mounted on an apertured lug 12ª provided on top of a bracket 25 having relatively adjustable clamping jaws 26 and 27 operable by a hand wheel 28 to clamp bracket 25 on the edge of a table or bench 29.

It will appear from the foregoing that a drawing board support has been provided which is capable of being adjusted at any desired angle in any desired position before the draftsman or artist by a single adjusting nut and, moreover, is capable of rapid readjustment to reposition the board by merely lifting the front edge of the board, turning to the desired position and then lowering the edge of the board which has been moved into the front position.

Obviously modifications of the invention may be resorted to without departing from the spirit thereof or the scope of the appended claims.

What is claimed is:—

1. The combination with a bracket formed as an equilateral triangular prism and having legs attached to the three sides thereof to provide an easel, said bracket being provided with an apertured lug, of an eye bolt journaled in said lug, a nut threaded onto one end of the eye bolt, a washer of resilient, frictional material between the nut and the adjacent face of the lug, a sleeve about the eye of the bolt bearing against the other face of the lug and having apertures therein registering with the eye of the bolt, and a board supporting member having a pin fixed thereto and extending down through said apertures and the eye of the bolt and having a shoulder bearing on said sleeve.

2. The combination with a bracket provided with an apertured lug, of an eye bolt journaled in said lug, a nut threaded onto one end of the eye bolt, a washer of resilient frictional material between the nut and the adjacent face of the lug, a sleeve about the eye of the bolt bearing against the other face of the lug and having apertures therein registering with the eye of the bolt, and a board supporting member having a pin fixed thereto and extending down through said apertures and the eye of the bolt and having a shoulder bearing on said sleeve.

3. A mounting for drawing boards comprising a bracket, a supporting member horizontally pivoted and axially movable on the bracket, a drawing board mount vertically swiveled by a pin extending through said supporting member, means comprising a bolt and nut associated with the supporting member for moving it axially and securing it in adjusted position, said unit cooperating with the bracket, a sleeve about the supporting member through which the swivel pin extends, said swivel member being adapted to be clamped by relative axial movement of the supporting member and sleeve, and a washer of resilient frictional material interposed between the nut and bracket.

4. A mounting for drawing boards comprising a bracket, a horizontally pivoted support on the bracket including members relatively movable axially, a drawing board mount swiveled on a pin extending through said relatively movable members, bolt and nut means associated with the relatively movable members, to secure the horizontally pivoted support in adjusted angular positions and to move the members relatively to each other, and means for holding the nut against turning with the bolt comprising a washer of resilient, frictional material between the nut and bracket.

FRANK L. JOHNSON.